United States Patent [19]

Wank et al.

[11] Patent Number: 5,039,464
[45] Date of Patent: Aug. 13, 1991

[54] PROCESS FOR DENSIFYING A CERAMIC PART

[75] Inventors: Larry A. Wank, Cornwallville; Joseph G. Braitling, Saugerties; Marie Kaczenski, Crompond, all of N.Y.

[73] Assignee: North American Philips Corporation, New York, N.Y.

[21] Appl. No.: 53,165

[22] Filed: May 21, 1987

Related U.S. Application Data

[63] Continuation of Ser. No. 731,812, May 8, 1985, abandoned.

[51] Int. Cl.$^5$ .............................................. C04B 35/64
[52] U.S. Cl. ........................................ 264/65; 264/82; 264/570
[58] Field of Search ............................ 264/82, 570, 65

[56] References Cited

U.S. PATENT DOCUMENTS

| | | | |
|---|---|---|---|
| 3,027,327 | 3/1962 | Blank | 252/62.5 |
| 3,853,973 | 10/1974 | Hardtl | 264/65 |
| 3,989,794 | 2/1976 | Berchtold | 264/332 |
| 4,247,755 | 1/1981 | Smith et al. | 219/400 |
| 4,254,070 | 3/1981 | Yodogawa et al. | 264/65 |
| 4,440,713 | 3/1984 | Rigby | 264/325 |

OTHER PUBLICATIONS

The Condensed Chemical Dictionary, 6th Edition, Reinhold Pub. Corp. New York, 1961, p. 106.

*Primary Examiner*—James Derrington
*Attorney, Agent, or Firm*—Jack E. Haken

[57] ABSTRACT

A process for densifying a ceramic part includes creating an oxygen-containing sealed atmosphere, heating and pressurizing a ceramic part within the oxygen-containing sealed atmosphere to a high temperature and a high pressure, soaking the part at the high temperature and high pressure, and then cooling the part to ambient temperature and ambient pressure.

8 Claims, 2 Drawing Sheets

PROCESS FOR DENSIFYING A CERAMIC PART

This is a continuation of application Ser. No. 731,812, filed May 8, 1985, now abandoned.

BACKGROUND OF THE INVENTION

1. Field of the Invention

The present invention relates to a process for densifying ceramic parts, and particularly to a process for densifying sintered ferrite ceramic parts.

2. Description of the Prior Art

The term ferrite generally denotes a class of non-metallic, ceramic ferromagnetic materials ($MFe_2O_4$) having a spinel-crystal structure. The M in the formula popularly is MnZn or NiZn. Ferrites have desirable magnetic properties such as a high resistivity relative to ferromagnetic metals, low hysteresis losses and good permeability making them particular useful in magnetic heads for video, audio, data storage and other related applications.

Generally, ferrites are manufactured by mixing measured amounts of metal oxides or metal carbonates and then pulverizing the mixture. The pulverized mixture is calcined and then wet-milled. The resulting wet-slurry is then spray-dried with a binder to produce a ready to press powder Ferrite parts are formed by pressing, molding or extruding.

After forming, the parts are sintered at temperatures of about 1,000° C. before the sintered parts are further densified to approximately theoretical density in a hot isostatic pressing (hipping) procedure. Prior art densifying processes "hip" the sintered ferrite part in a sealed totally-inert atmosphere, typically of argon. See, for example, U.S. Pat. No. 4,440,713, issued Apr. 3, 1984, entitled "Process for Making Fine Magnetic Ferrite Powder and Dense Ferrite Blocks," for a discussion of hipping nickel-zinc ferrite in a pure argon atmosphere.

Generally, hipping a ferrite or other ceramic part includes the steps of disposing a sintered ferrite part in a pressure vessel at ambient temperature and at ambient pressure, creating a sealed atmosphere within the vessel, heating the part to a soaking temperature while pressurizing the part to a soaking pressure, soaking the part at the soaking temperature and pressure, and then cooling the part to ambient temperature and pressure.

A major drawback encountered with prior art hipping procedures is that, during hot isostatic pressing, the ferrite undergoes chemical changes which adversely affect the magnetic properties of the resulting hipped ferrite part. The inventors believe that such changes are caused substantially by hipping in the totally inert atmosphere. In a pure argon atmosphere at a high temperature (e.g. 1185° C.) and a high pressure (e.g. 15 KPSI), the inventors believe that the Fe ions of the ferrite are reduced, and that the reduced ions then change their sites in the crystal lattice of the ferrite. Thus, the chemistry of the hipped ferrite part is changed from that before hipping. For a discussion of various mechanisms which may be involved in this chemical change, see Van Vlack, *Elements of Materials Engineering*, Third Edition,—(Addison-Wesley Publishing Company, 1975).

An additional drawback of the prior art hot isostatic pressing procedure is the necessity for closely surrounding the sintered ferrite or other sintered ceramic with a protective matrix (or "frit"). The frit consists of sintered ceramic pieces having the same chemical composition as the sintered ceramic material to be hipped. The frit is utilized in a prior art attempt to minimize the previously discussed chemical changes.

SUMMARY OF THE INVENTION

It is the principal object of the present invention to provide a ferrite densifying process which substantially preserves the chemistry of the ferrite to that before densifying.

It is a further object of the present invention to provide a ferrite densifying process which eliminates the necessity for a protective matrix surrounding the ferrite part to be densified.

In accordance with the invention, a process for densifying a sintered ferrite part includes disposing the part in a pressure vessel; creating an a sealed atmosphere within the pressure vessel having a fixed level of oxygen; heating the part to a soaking temperature while isostatically pressurizing the part to a soaking pressure; soaking the part at the soaking temperature and soaking pressure for a suitable period, and then cooling the part to ambient temperature while depressurizing the part to ambient pressure.

The inventors have discovered that, by precisely determining (at a point in the process prior to the soaking step) the level of oxygen gas included in the sealed atmosphere, the chemistries of the ferrite part prior to and after hipping are substantially identical. An oxidation layer formed on a ferrite part hipped according to the invention evidences that the hipped ferrite part has not been reduced to any significant degree. Also, ferrite hipped according to the invention has a density greater than 99% theoretical density.

Preferably, the level of oxygen gas is a preferred level which the inventors have discovered is dependent upon the specific chemical composition of the respective type of ferrite material which is to be processed. Thus, for a MnZn ferrite material having a specific chemical composition (discussed below), the preferred level is 0.05% by volume of the sealed atmosphere. Using the preferred level results in the least change in the specific composition during densifying.

The inventors have discovered further that, for each type of ferrite material, the level of oxygen gas must be within a respective critical range of levels. Processing a type of ferrite material by using an oxygen level outside of its respective critical range produces a densified part having undesirable magnetic and undesirable other properties.

Further and still other objects of the present invention will be more readily apparent in light of the description when taken in conjunction with the accompanying drawing.

DETAILED DESCRIPTION OF THE INVENTION

Figure 1:
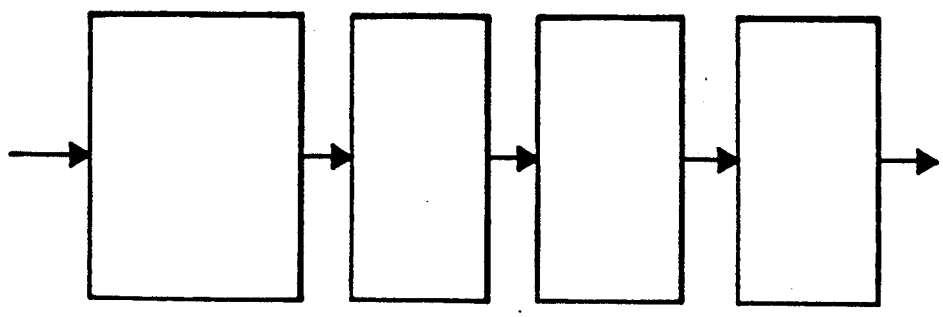
FIG. 1 is a block diagram showing the general steps of hot isostatically pressing a ferrite part according to the invention.

The general inventive steps for densifying a ferrite part or other ceramic part are shown in FIG. 1. According to the invention, the part is densified in an oxygen-containing sealed atmosphere created within the pressure vessel of the hot isostatic pressing system. The oxygen-containing sealed atmosphere must be created within the pressure vessel before the soaking step at which the part is maintained at a constant high temperature (e.g. 1200° C.) and at a constant high pressure (e.g. 15 KPSI) for a suitable time period (e.g. 2 hours). More specifically, oxygen gas must be introduced into the pressure vessel at a point of the process prior to the soaking step so that the sealed atmosphere includes a fixed level of oxygen. The inventors have discovered that the oxygen level, within a range for each type of ferrite or other ceramic, is critical for purposes of the invention. For example, a too high oxygen level (i.e. above of the respective critical range) when processing a MnZn ferrite can ruin the MnZn ferrite's magnetic properties. A too low level when processing a NiZn ferrite (i.e. below the respective critical range) can ruin that ferrite's magnetic properties.

Preferably, each specific composition of a respective type of ferrite or other ceramic material is processed using a preferred level of $O_2$.

Processing not at the preferred oxygen level but at another level within the respective critical range produces a satisfactorily although not a most desirably processed part. For example, when processing a specific composition of MnZn ferrite material, the preferred level of $O_2$ within the sealed atmosphere of the pressure vessel prior to soaking is 0.05% by volume of the sealed atmosphere. Processing most specific compositions of NiZn ferrite or other ceramics (listed below) preferably employs an $O_2$ level in a range of $1.00\% \leq O_2 \leq 1.66\%$ by volume. The remaining portion of the sealed atmosphere in any and all of these cases can consist essentially of an inert gas, a combination of inert gases (e.g. argon and/or helium), or even nitrogen whether or not in combination with an inert gas or gases.

The present inventors have compiled critical ranges for the $O_2$ levels for various types of ceramic materials.

| CRITICAL RANGE | |
|---|---|
| Type of Ceramic Material | $O_2$ Level (volume %) |
| MnZn ferrite | $.005 \leq O_2 \leq .10$ |
| NiZn ferrite | $.05 \leq O_2 \leq 2.0$ |
| Calcium Titanate | $.05 \leq O_2 \leq 2.0$ |
| Barium Titanate | $.05 \leq O_2 \leq 2.0$ |
| Calcium Strontium Titanate | $.05 \leq O_2 \leq 2.0$ |
| Zinc Titanate | $.05 \leq O_2 \leq 2.0$ |
| Partially Stabilized Zirconia | $.05 \leq O_2 \leq 2.0$ |

The $O_2$ level of the sealed atmosphere must be within the respective critical range in order to provide satisfactory results—i.e. substantially not affecting the chemistry of, for example, the ferrite. Analysis of the $O_2$ level can be accomplished by known techniques prior to soaking. Any oxidation layer resulting at the outer surfaces of the hipped part can be removed, for example, by machining. Apparatus for densifying (hipping) the part according to the invention is commercially available and may be a Model No. 15Q 16-42 SCF 140 hot isostatic press system manufactured by Autoclave Engineers, Inc., Erie, Pa. As shown schematically in FIG. 3, the system 10 generally comprises a pressure vessel 20 which includes a heater 30, a pedestal 40, and a controllable gas vent 50. An evacuation pump is fluid coupled to the internal atmosphere 21 of the vessel 20. The system 10 also comprises gas handling equipment which includes a pair of high pressure pumps 60a, 60b which are fluid coupled to the contents of gas storage tanks 70a, 70b. The heater 30 is coupled to a power source 31 while the pumps 60a, 60b are fluid coupled to the internal atmosphere 21 of the vessel 20. See also U.S. Pat. No. 4,247,755, issued Jan. 27, 1981, entitled "High-Pressure Autoclave."

Tank 70a contains, pure argon at approximately 1.7 KPSI.

Tank 70b contains, a gas blend consisting essentially of argon 98.3% and oxygen 1.7% by volume, at 1.7 KPSI.

Figure 3:
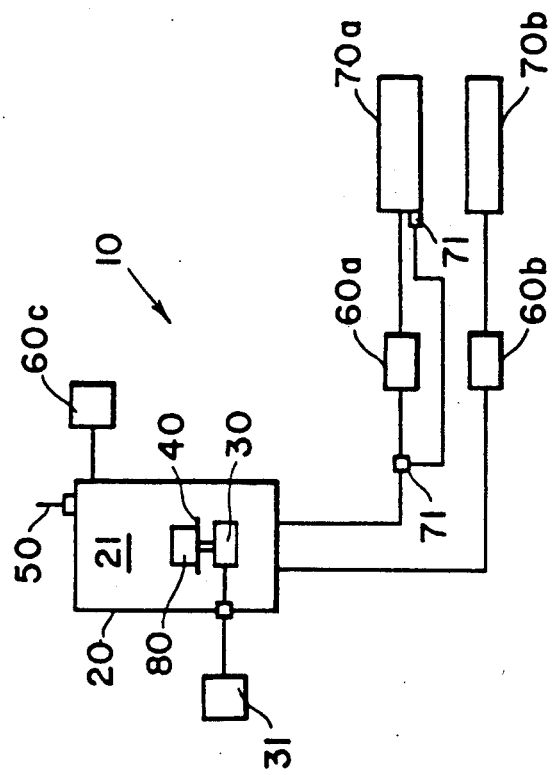
FIG. 3 is a schematic diagram of a hot isostatic pressing system for practicing the invention.

A preferred process for densifying a sintered manganese-zinc ferrite part will be discussed with reference to the curves P, T of FIG. 2 in combination with the schematic of FIG. 3. The preferred process requires approximately 16 hours, after which the ferrite part is returned to ambient temperature and ambient pressure in approximately 1¾ hours.

A sintered manganese-zinc ferrite part 80 of a specific composition (mole %:$Fe_2O_3$-52.4%, ZnO-18.1%, MnO-29.5%) is suitably positioned on the pedestal 40 inside the vessel 20 whose internal atmosphere is at ambient temperature and ambient pressure. The vessel is sealed. The sealed vessel is evacuated by an evacuation pump 60c to a suitable vacuum (e.g. 200 millitorr). At a starting time O, argon gas from the storage tank 70a is introduced into the vessel 20 (e.g. by opening valves 71) until the pressure within the vessel is approximately 1700 PSI. Raising the pressure to 1700 PSI by this technique (called "pre-filling") requires approximately one hour.

When the argon/oxygen blend from tank 70b is introduced into the vessel's sealed atmosphere 21, the blend creates the preferred level of $O_2$ (in this case, 0.05% by volume) within the sealed atmosphere. Additional argon is the pumped into the vessel 20 at 2400 PSI/hour until the pressure within the vessel is approximately 2340 PSI.

The $O_2$/Ar mixture is then pumped into the vessel from the storage tank 70b until the pressure within the vessel is approximately 2380 PSI at which pressure further pumping from argon tank 70a raises the pressure within the vessel to approximately a 3880 PSI set point. Introducing the argon gas between 2380 and 3880 PSI thoroughly mixes the $O_2$ gas within the sealed atmosphere of the vessel. Reaching the 3880 PSI set point from the starting time takes approximately two hours.

At the set point, the sealed atmosphere within the vessel is analyzed to confirm that the preferred level of $O_2$ (in this case, 0.05%) is present within the vessel 20. After confirming the presence of the preferred level of $O_2$, heat is applied to the sealed atmosphere and, thus, by convection, to the part 80 by the heater 30 coupled to the power source 31. Preferably, heat is applied so that the temperature T within the vessel increases at a rate of approximately 240° C. per hour. Rates greater than 300° C. per hour create thermal shock problems for the ferrite. The pressure P within the vessel, of course, increases with increasing temperature. When the temperature and pressure within the vessel reach a soak point (preferably 1200° C. at 15 KPSI) the application of heat is adjusted and the ferrite part is held (soaked) at this high temperature and high pressure for approximately two hours. The soak time may be longer, but should not be less than one hour for proper densification.

Figure 2:
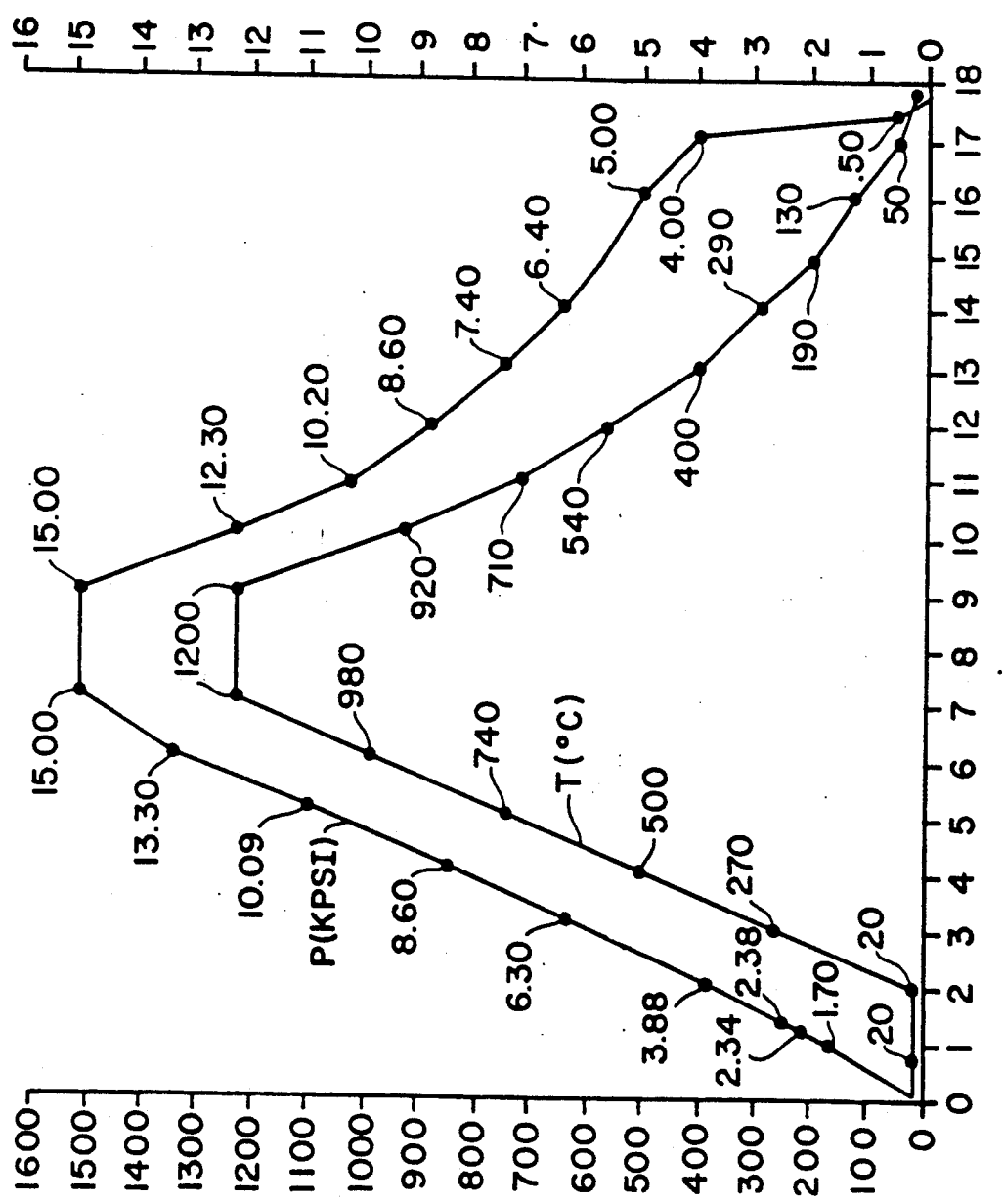
FIG. 2 is a graph showing (temperature and pressure) versus time of a preferred densifying process according to the present invention.

After soaking, heater 30 is shut off and the part is cooled and depressurized naturally to a first let down point of approximately 130° C. and 5000 PSI as shown by the curves T, P of FIG. 2. Once the part has cooled to the let down point, complete densification has occurred. The natural cooling, of course, results in the concomitant pressure reduction as shown by the curve P in FIG. 2. Cooling to the first let down point requires approximately seven hours.

Returning the part to ambient temperature and ambient pressure can be accomplished by known techniques. For example, at the first let down point, gases are released (e.g. by venting to the ambient atmosphere) from the vessel for approximately one hour until the pressure drops to about 4000 PSI and the temperature to about 50° C. (second let down point). Further venting for about one-half hour decreases the pressure to about 500 PSI. A final exhaust for about fifteen minutes decreases the temperature and pressure to ambient temperature and ambient pressure.

The specific composition of the manganese-zinc ferrite part densified according to the above process exhibited substantially no change in its chemistry. However, the outer surfaces of the densified part had an oxidation layer of approximately 0.0001 inches thickness. Significantly, analysis of the sealed atmosphere at various points during processing revealed that the initially created $O_2$ level (0.05%) decreased by approximately 20% during a 16 hour processing cycle. The inventors believe that such decrease is to oxidation of attributable to the ferrite part. Additional oxygen may be utilized by certain heating elements (e.g. SiC) of the heater 30.

Heat can be applied at a faster rate, not to exceed, 300° C./hr, dependent, upon the mass of the ceramic workpiece. Further, the faster rate can be utilized to achieve a soak temperature of 1300° C. a the soak pressure of 15 KPSI. Also, a soak temperature of 1100° C. and a soak pressure of 13 KPSI have also provided satisfactory results for specific compositions of ceramics. Generally, soak temperatures can be within a range of constant temperatures of between approximately 1100° C. and 1300° C., while soak pressures can be within a range of constant pressures of between approximately 13 KPSI to 15 KPSI. It should be noted that natural cooling of ferrite parts during hipping should not exceed approximately 500° C. per hour in order to avoid thermal shock problems.

Finally, instead of natural cooling, a ferrite or other ceramic part can be controllably cooled to the first let down point by controllably venting the sealed atmosphere to the ambient atmosphere. The controlled cooling can also be used, for example, to reduce the level of $O_2$ (more specifically the partial pressure of $O_2$; partial pressure=mole fraction×total pressure) within the sealed vessel during cooling. Thus the partial pressure of $O_2$ can be varied with temperature and the ferrite equilibrium relations stated by P. I. Slick can be followed during cooling See the article by Slick, P. I., entitled "A Thermogravimetric Study of Equilibrium Relations between a MzZn Ferrite and an $O_2$—$N_2$ Atmosphere," *FERRITES: Proceedings on the International Conference*, July 1970, Japan, ppgs 81–83, and particularly FIG. 3., which article is hereby incorporated by reference.

What is claimed:

1. A process for densifying a sintered ceramic part comprising
   placing the sintered part in a sealed container,
   introducing an atmosphere containing a fixed amount of oxygen within a critical range into said container, said fixed amount being that which, at the conclusion of the process, leaves a layer of oxidation on the ceramic without substantially affecting the chemistry of the ceramic, the remainder of the atmosphere being substantially inert,
   raising the temperature to a constant level over 1100° C.,
   raising the pressure to a constant level over 13,000 PSI,
   soaking the part at said constant temperature and pressure for at least one hour,
   cooling said ceramic at a rate not exceeding 500° C. per hour.

2. A process as in claim 1 wherein said part is a manganese-zinc ferrite part, said critical range being 0.005% to 0.100% oxygen by volume.

3. A process as in claim 2 wherein said fixed amount of oxygen is about 0.05% oxygen by volume.

4. A process as in claim 1 wherein the ceramic part is a material selected from the group consisting of nickel-zinc ferrite, calcium titanate, barium titanate, calcium strontium titanate, zinc titanate, and partially stabilized zirconia, said critical range being 0.05% to 2.0% oxygen by volume.

5. A process as in claim 4 wherein the fixed amount of oxygen is between 1.00% and 1.66% by volume.

6. A process as in claim 1 wherein said constant temperature level is in the range of 1100° C. to 1300° C.

7. A process as in claim 1 wherein the constant pressure is in the range of 13,000 PSI to 15,000 PSI.

8. A process as in claim 1 wherein the layer of oxidation is about 0.0001 inch thick.

* * * * *